June 26, 1962 — S. R. CRAY — 3,041,583
PULSE FORMER
Filed Nov. 19, 1956

INVENTOR
SEYMOUR R. CRAY
BY Cushman, Darby & Cushman
ATTORNEYS

United States Patent Office 3,041,583
Patented June 26, 1962

3,041,583
PULSE FORMER
Seymour R. Cray, Minneapolis, Minn., assignor to Sperry Rand Corporation, New York, N.Y., a corporation of Delaware
Filed Nov. 19, 1956, Ser. No. 623,041
17 Claims. (Cl. 340—174)

This invention relates generally to magnetic devices and more specifically to circuits utilizing magnetic devices for generating variable length electrical impulses.

The value of small cores of magnetic material for use as storage and logical elements in data handling systems is being increasingly recognized, particularly because of their miniature size, low power requirements, reliability and of their non-volatile storage capability. These magnetic elements preferably with rectangular hysteresis loops are able to handle binary encoded information in the form of static residual magnetization after being even momentarily magnetized in either of two directions. The direction of static residual magnetization can be switched by passing a current impulse through a winding on the magnetic element which creates a surge of magnetomotive force oppositely to the residual magnetization sufficient to reverse the magnetic polarity of the core.

It is convenient to control the switching rate of these magnetic devices by limiting the voltage induced in the windings in the magnetic element. The larger the induced voltage the shorter the switching time. This invention utilizes this basic principle to provide an economical means to form variable width electrical impulses.

Accordingly, it is a prime object of this invention to provide a circuit utilizing a magnetic device for generating an electrical impulse of duration determined in accordance with the difference of two levels of potential.

It is another object of this invention to provide a magnetic pulse former which provides a pulse controlled in duration by the magnitude of a single supply voltage.

It is a further object of this invention to provide a timing or delay circuit made in conformance with the preceding objects.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1:
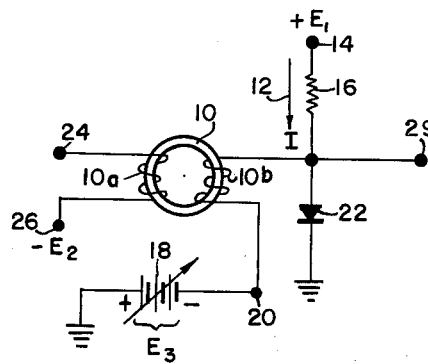
FIGURE 1 illustrates an embodiment of this invention.

Referring now to FIGURE 1, magnetic core 10 is forced toward positive magnetic saturation by current I flowing in the direction of arrow 12 from a positive voltage $E_1$ at terminal 14 through resistor 16 and winding 10b to ground (0 volt) through a negative potential $E_3$ produced by variable battery 18 connected at terminal 20 and to ground through an asymmetric or unidirectional device such as diode 22. In a magnetic core exhibiting a rectangular hysteresis loop the magnetomotive force generated by current I in winding 10b must be sufficient to force magnetic core 10 from one magnetic stable state to a second such state, and for purposes of example herein, without limitation intended, it will be assumed that current I forces core 10 from negative magnetization to positive magnetization in absence of any other magnetomotive force.

In absence of an input signal to terminal 24, the voltage across winding 10a is a negative $E_2$ volts since such is applied thereto at terminal 26. A positive going electrical impulse 28 (FIGURE 2, line a) applied to terminal 24 at time $t_0$ provides current through winding 10a as an input signal which generates a magnetoforce (M.M.F.) of sufficient magnitude to switch the magnetic polarity or state of element 10 from positive to negative magnetization even in the presence of the opposing M.M.F. generated by current I. Upon removal of input impulse 28 at time $t_1$, current I causes element 10, to be reset to the positive state. The resultant induced voltage in winding 10b by current I resetting core 10 is formed into a variable width pulse by the clamping action of diode 22 in conjunction with negative voltage $E_3$. This pulse may be noted at output terminal 29. The pulse width is inversely proportional to the magnitude of supply voltage $E_3$ when diode 22 is connected to ground potential. In effect the circuit acts as a voltage-to-pulse width converter.

In switching the magnetic core the voltage-time integral is a constant, thus:

$$\int_0^T e\,dt = k \qquad (1)$$

where $e$ is the instantaneous voltage across the switch winding, $dt$ is the time increment, $T$ is the total switch time and $k$ is a constant determined by conduit parameters. If $e$ is the constant value $E_3$ for the major portion of the switching time, Equation 1 may be approximated as $$E_3 T = k \qquad (2)$$

Figure 2:
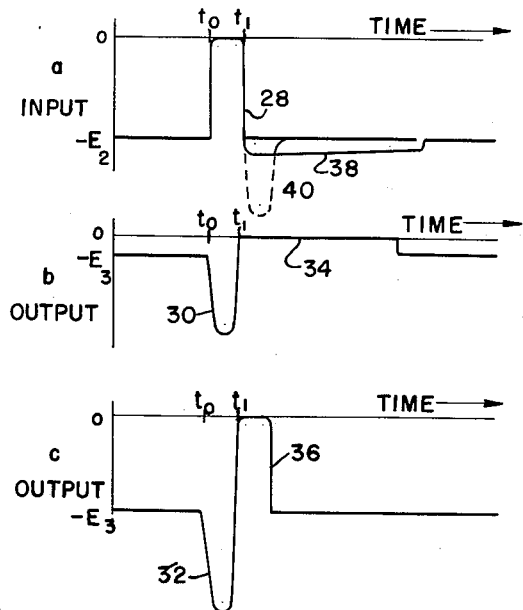
FIGURE 2 illustrates voltage waveforms which may be associated with the circuit of FIGURE 1.

The operation of the circuit may better be understood with reference to the waveforms illustrated in FIGURE 2. As previously mentioned, the input signal to winding 10a may be caused by a pulse such as voltage pulse 28 in line a of FIGURE 2. Such an input signal can be furnished by any type of switches including thermionic vacuum tubes, transistors, magnetic cores or combinations thereof. Additionally, since the circuit of FIGURE 1 is insensitive to the width of the input impulse, the only requirement being that the input to terminal 24 be sufficient to switch the magnetic core, depression of a pushbutton or operation of a toggle switch can likewise provide the input signal. The waveforms in lines b and c of FIGURE 2 illustrates the output at terminal 29 with small and large magnitudes of voltage $E_3$, respectively. As the input signal 28 causes core 10 to switch, an E.M.F. is induced in winding 10b. Such induced E.M.F.'s are illustrated as the negative going portions 30 and 32 of the waveforms in lines b and c of FIGURE 2. The switching time for core 10 attributable to the input wave 28 is of no consequence to the operation of the circuit, but the core must be completely switched before the input wave is removed.

An output signal in the form of a positive going voltage pulse 34 is obtained when negative voltage $E_3$ is most positive, i.e., of smallest magnitude, for the specific circuit, which voltage produces the maximum switching time since the smallest reasonable constant switching voltage is maintained across winding 10b. A voltage pulse 36 may be obtained when $E_3$ is made most negative for the specific circuit, which voltage then produces the minimum switching time since the maximum switching voltage is maintained across winding 10b. All output signals at terminal 29, such as pulses 34 and 36, are limited in positive going amplitude to the potential level to which the cathode end of diode 22 is connected, in this case ground potential or zero volts; while such signals have a duration determined in accordance with the difference, i.e., inversely proportional to the magnitude difference, between potential $E^3$ and the limiting potential, such difference in the example of FIGURE 1 being $E_3$ volts. The range of obtainable pulse widths is limited only by circuit design; in the laboratory it has been determined that a ratio of 8-to-1 is easily obtainable. It is obvious that a greater range of pulse widths is obtainable by improving the circuit design including varying the properties of the magnetic core.

The portion 38 of voltage wave 28 which is more negative than voltage $E_2$ is the E.M.F. induced in winding $10a$ by the core 10 switching back when pulse 34 is generated. Similarly, the dotted line pulse 40 is produced in winding $10a$ when the output of winding $10b$ is pulse 36.

Figure 3:
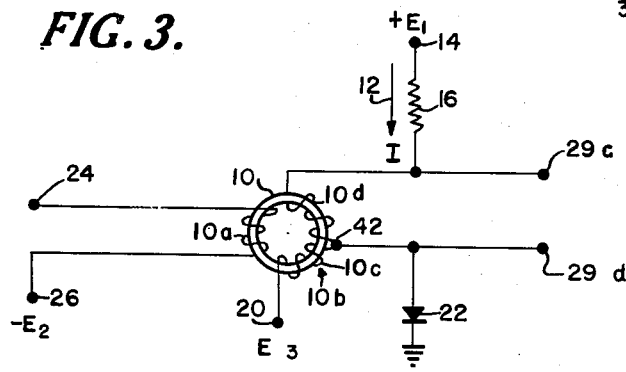
FIGURE 3 illustrates a modification of this invention.

Because of the transformer action between the winding on a magnetic core, the voltage induced in a given winding is directly related to voltages in every other winding. If a voltage on one winding is clamped, the corresponding voltages in all other windings are also clamped, the maximum magnitudes of said voltages are determined by the limiting or clamping potential and the turns ratios of the windings. A modification of this invention utilizing this phenomenon to obtain multiple outputs from one pulse former at different maximum voltage amplitudes is illustrated in FIGURE 3. This circuit operates identically to the circuit of FIGURE 1, but is modified to provide two clamped output signals at terminals $29c$ and $29d$ respectively. Terminal $29d$ and the voltage limiting means (diode 22) are connected to winding $10b$ intermediate its ends at point 42, thereby dividing winding $10b$ into two sections $10c$ and $10d$. Upon removal of an input pulse to terminal 24, current "I" flows in both winding sections $10c$ and $10d$ to reset core 10 to positive magnetic polarity. The resetting time is controlled by the clamping action on winding section $10c$ by the asymmetric device 22 and negative voltage $E_3$, during which time winding sections $10c$ and $10d$ furnish two impulse outputs of different amplitudes, the larger appearing at terminal $29c$ and the smaller at terminal $29d$. It is obvious that additional windings may be added to provide a wider variety of output pulses. Such additional windings may be either in series circuit with winding $10b$ or may be electrically isolated, i.e., only magnetically coupled to said windings. It is preferred that all output windings be in series circuit.

Figure 4:
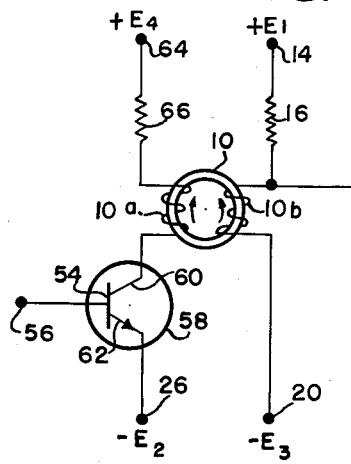
FIGURE 4 illustrates a delay circuit utilizing the circuit of FIGURE 1.
Figure 4:
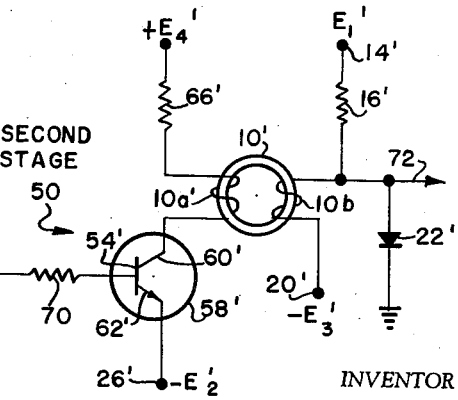

FIGURE 4 illustrates a specific embodiment of this invention wherein the input is transistor triggered and the output drives a second stage 50 of the same type of circuit to form in all a timing or delay circuit. In the second stage, elements alike to those in the first stage 52 are given the same designating characters followed by a prime. A voltage input applied to the base electrode 54 via terminal 56 makes the switching transistor 58 conduct heavily. The resultant current flowing into the collector electrode 60 and out of emitter electrode 62 to negative voltage $E_2$ at terminal 26 emanates from positive voltage $E_4$ at terminal 64 and goes serially through resistor 66 and winding $10a$ so as to be an input signal which induces an M.M.F. in winding $10a$ sufficient to cause magnetic core 10 to change state. Upon removal of the input signal to terminal 56, the current flowing in winding $10b$ resets core 10. As before, the constant switching voltage is determined by the limiting potential (ground) connected to clamp diode 22 and negative voltage $E_3$ at terminal 20, since coupling resistor 70 has a relatively high impedance. The induced E.M.F. in winding $10b$ applied to the base 54' of a second switching transistor 58' makes it conductive. The resultant current flowing through winding $10a'$ to the collector 60' forces core 10' to change state. The second stage pulse former 50 does not provide an output impulse on line 72 until transistor 58' is again made non-conductive by the subsiding, if not the cessation, of the output pulse from winding $10b$, since only at that time will potential $E_1'$ at terminal 14' shift core 10'. Thus the time delay between the end of the input signal to terminal 56 and the beginning of the output signal from core 10' is determined by the magnitude of voltage $E_3$ at terminal 20 and the limiting potential connected to diode 22. The duration of the output signal on line 72 is similarly determined by the difference in voltage $E_3'$ at terminal 20' and the clamping potential for diode 22'. It is obvious, therefore, that this invention can be used to form delay lines and timing circuits.

The output impulse from winding $10b$ can be applied to other output circuits in addition to transistor 58' by inserting an isolation diode between junction 74 and each output circuit. A manner of providing additional outputs is illustrated in my copending application filed November 19, 1956, Serial No. 623,039, entitled "Magnetic Core Circuits."

It is to be understood that the clamping diodes may be connected to a voltage source, variable or not, instead of to ground potential. Thus the pulse width may be determined by the difference of two voltages or by varying either voltage $E_3$ or the clamp voltage on the clamping diode. Also the polarity of the output pulse may be reversed by merely reversing the clamping diode and interchanging voltages $E_1$ and $E_3$. It is obvious that there are numerous other such modifications.

Certain features in this application are also disclosed in my copending application, Serial Nos. 623,038, 623,039 and 623,040 all filed the same date as the present application.

Thus it is apparent that there is provided by this invention systems in which the various phases, objects, and advantages herein set forth are successfully achieved.

Modifications of this invention not described herein will become apparent to those of ordinary skill in the art. Therefore, it is intended that the matter contained in the foregoing description and the accompanying drawings be interpreted as illustrative and not limitative, the scope of the invention being defined in the appended claims.

What is claimed is:

1. A circuit comprising a bistable magnetic core element having input winding means and output winding means, means for providing an input signal to the input winding means for shifting said core element to a first state, means coupled to the output winding means for inducing a voltage pulse thereacross by shifting the element to a second state, said latter means being effective concurrently at least in part with said input signal with the input signal having such a magnitude as to overcome the effect of said latter means to shift the element to said first state and said latter means shifts the element to said second state upon subsiding of the input signal, and means connected at least partially across the output winding means and including amplitude limiting means for controlling the width of the said induced voltage pulse.

2. A circuit as in claim 1 wherein the limiting means includes an asymmetric conducting device connected between a reference potential and a terminal of the output winding means remote from one end thereof.

3. A circuit as in claim 2 wherein the width controlling means further includes a potential source connected between said one end of the output winding and said reference potential.

4. A circuit as in claim 1 wherein the input signal providing means includes a switch, one electrode of which is coupled to the input winding means and to a first predetermined voltage and another electrode of which is connected to a second predetermined voltage, the arrangement being such that upon enablement of the switch, current flows from one of said predetermined voltages to the other to provide said input signal.

5. A circuit as in claim 4 wherein said input winding means is connected in series with said one electrode to the first voltage whereby the current flowing between said predetermined voltages upon the switch being enabled is said input signal.

6. A circuit as in claim 4 wherein said switch is a transistor.

7. A circuit as in claim 4 and further including a second bistable magnetic core element having second input winding means and second output winding means, means coupled to the second output winding means for inducing a voltage pulse thereacross by shifting the element to a second state, means connected at least partially across the second output winding means for controlling the width of the voltage pulse induced thereacross, means including a second switch for intercoupling the second input winding means and the first mentioned output winding means and which upon enablement produces an input signal across said second input winding means which causes said second core to switch to a first state, said means coupled to the second output winding means being in effect concurrently at least in part with the input signal across said second winding whereby said input signal overcomes said effect to shift the second element to the first state and said latter means shifts the second element to said second state when the input signal subsides, the arrangement being such that the voltage pulse induced across the first mentioned output winding means operates said second switch to cause said second input signal to the second core element whereby an induced output signal occurs from said second output winding means after a delay determined in accordance with the width of said first mentioned output pulse and endures for a time determined by said second mentioned width controlling means.

8. A circuit as in claim 7 wherein the second switch has one electrode coupled to the second input winding means and to a third predetermined voltage and another electrode coupled to a fourth predetermined voltage, a third electrode thereof being coupled to said first mentioned output winding means for enablement of said second input signal by said voltage pulse.

9. A circuit as in claim 7 wherein said switches are transistors.

10. A circuit as in claim 8 wherein said second input winding means is connected in series with said one electrode of said second switch to the third predetermined voltage whereby current flowing between said third and fourth predetermined voltages is said second input signal.

11. A circuit comprising a bistable magnetic core element having input winding means and output winding means, means for providing an input signal to the input winding means for shifting said core element to a first state, means coupled to the output winding means for inducing a voltage pulse thereacross by shifting the element to a second state, said latter means being effective concurrently at least in part with said input signal so that said input signal overcomes the effect of said latter means to shift the element to said first state and said latter means shifts the element to said second state upon subsiding of the input signal, and means connected at least partially across the output winding means for limiting the width of the induced voltage pulse to a predetermined value.

12. A circuit as in claim 11 wherein the width limiting means comprises an asymmetric conducting device connected between a terminal remote from one end of the output winding means and a reference potential, and a second fixed potential connected between said one end of the output winding and said reference potential.

13. A circuit as in claim 12 wherein the asymmetric conducting device has one end connected intermediate the ends of the output winding means and the other end connected to said reference potential.

14. A circuit as in claim 12 wherein the asymmetric device is connected between said reference potential and the end of said output winding means opposite said one end.

15. A circuit for providing a variable width pulse comprising a bistable magnetic core element having an input winding and output winding, means for providing an input signal to the input winding for shifting said core element to a first state, means coupled to the output winding means adapted to provide a current to said output winding for shifting the element to a second state in opposition to said input signal and for developing a voltage across said output winding upon being so shifted, said latter means being effective to provide said current concurrently at least in part with said input signal such that said input signal overcomes the opposing effect of said current in shifting the element to said first state and said element is shifted to said second state by said current upon subsiding of said input signal, an asymmetric conducting device connected to one end to the output winding at a terminal remote from the end opposite said one end of the output winding and at the other end to a fixed potential, said asymmetric conducting device allowing said terminal of the output winding to vary from said first fixed potential in only one direction, and a voltage source connected between said fixed potential and said opposite end of the output winding thereby fixing the potential thereof, said asymmetric conducting device and said voltage source operating to control the width of the output pulse by limiting the amplitude of induced voltage across the output winding when the core shifts to said second state.

16. A circuit for providing a plurality of variable width pulses comprising a bistable core element having an input winding and an output winding means for providing an input signal to the input winding for shifting said core element to a first state, a first voltage source connected to one end of the output winding for inducing a voltage thereacross by shifting the element to a second state in opposition to said input signal, said first voltage source being effective concurrent with said input signal at least in part to a degree such that said input signal overcomes the opposing effect of said first voltage source to shift said core element to the first state and said element is shifted to the second state only upon subsiding of said input signal, an asymmetric conducting device connected at one end to a point intermediate the ends of said output winding effectively forming thereby two output sections and at the other end to a fixed potential, said asymmetric device allowing said one end of the output winding and said intermediate point thereof to vary from said first fixed potential in only one direction, and a second voltage source connected between said fixed potential and the other end of the output winding thereby fixing the potential thereof, said asymmetric conducting device and said second voltage source operating to control the width of the output pulse of each section by limiting the amplitude of induced voltage across the output winding when the core shifts to said second state.

17. A circuit for providing a time delay comprising a first bistable magnetic core element having a first input winding and a first output winding, first means for providing an input signal to the first input winding for shifting said core element to a first stable state, said first means including a switch having one electrode coupled to the first input winding and to a first predetermined voltage and another electrode connected to a second predetermined voltage, the current flowing from one voltage to the other upon enablement of the switch providing said input signal, a third voltage source connected to one end of the first output winding for inducing a voltage thereacross by shifting the element to a second state in opposition to said input signal, said third voltage source being effective concurrently with said input signal at least in part to a degree such that said input signal overcomes the opposing effect to shift said core element to the first state and said element is shifted to the second state by said third voltage source only upon subsiding of said input signal, a first asymmetric conducting device connected at one end to the output winding at a terminal remote from the end opposite said one end of the output winding and at the other end to a fixed potential, said asymmetric conducting device allowing said terminal at the output winding to vary from said fixed potential in only one direction, a fourth voltage source connected between said fixed potential and said opposite end of the output winding thereby fixing the potential thereof, said asymmetric conducting device and said fourth voltage source operating to control the width of the output pulse by limiting the amplitude of induced voltage across the output winding due to the core shifting to a second state, a second bistable magnetic core element having a second input winding and a second output winding, means including a second switch for intercoupling the second input winding and the first output winding which upon enablement produces an input signal across said second input winding causing said second core to switch to a first state, said second switch having a first electrode coupled to the second input winding and to a fifth predetermined voltage, a second electrode connected to a sixth predetermined voltage, and a third electrode coupled to the output terminal of the first ouput winding, the current flowing from the fifth voltage to the sixth voltage upon receipt of the output pulse from the first output winding causing said second core to switch to a first state, means coupled to one end of the second output winding for inducing a voltage pulse thereacross by shifting the element to a second state in opposition to the input signal to said second input winding, said latter means being operatively effective in a manner identical to that of the third voltage source connected to said first output winding, a second asymmetric conducting device connected at one end to the second output winding at a terminal remote from the end opposite said one end of the second output winding and at the other end to a second fixed potential, said second asymmetric conducting device allowing said terminal of the second output winding to vary from said second fixed potential in only one direction, a seventh voltage source connected between said second fixed potential and said opposite end of the second output winding thereby fixing the potential thereof, said second asymmetric conducting device and said seventh voltage source as connected thereby controlling the width of the second output pulse by limiting the amplitude of induced voltage across the second output winding due to the second core shifting to a second state, the arrangement being such that the voltage pulse induced across the first output winding operates said second switch to cause said second input signal to said second core element whereby said second output signal occurs after a delay determined in accordance with the width of said first mentioned output pulse and endures for a time determined by said second fixed potential and said seventh voltage source.

References Cited in the file of this patent

UNITED STATES PATENTS

| | | |
|---|---|---|
| 2,716,156 | Harris | Aug. 23, 1955 |
| 2,729,755 | Steagall | Jan. 3, 1956 |
| 2,792,506 | Torrey | May 14, 1957 |
| 2,798,169 | Eckert | July 2, 1957 |
| 2,876,440 | Eckert | Mar. 3, 1959 |
| 2,934,270 | Logue | Apr. 26, 1960 |
| 2,997,599 | Bonn | Aug. 22, 1961 |